June 9, 1936.    L. GELBMAN    2,043,374
SNOW PLANE AND SCOOTER PLANE
Filed Feb. 12, 1935
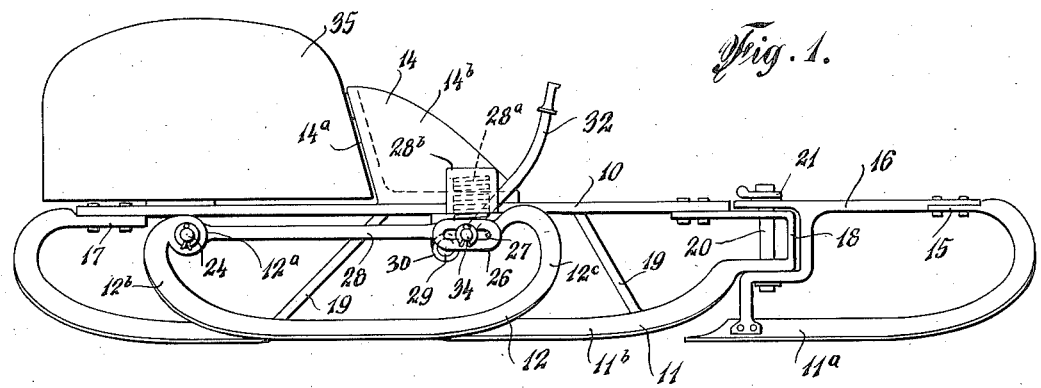
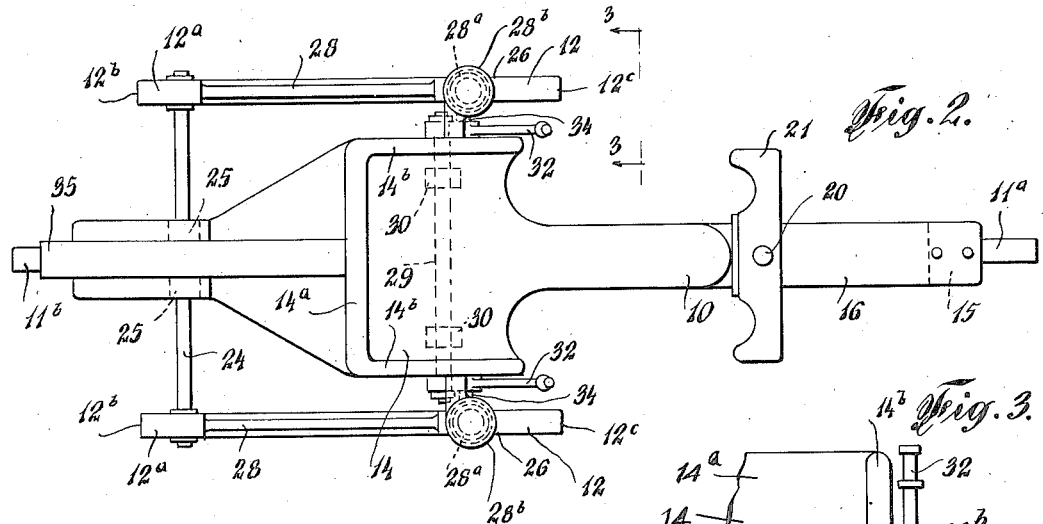
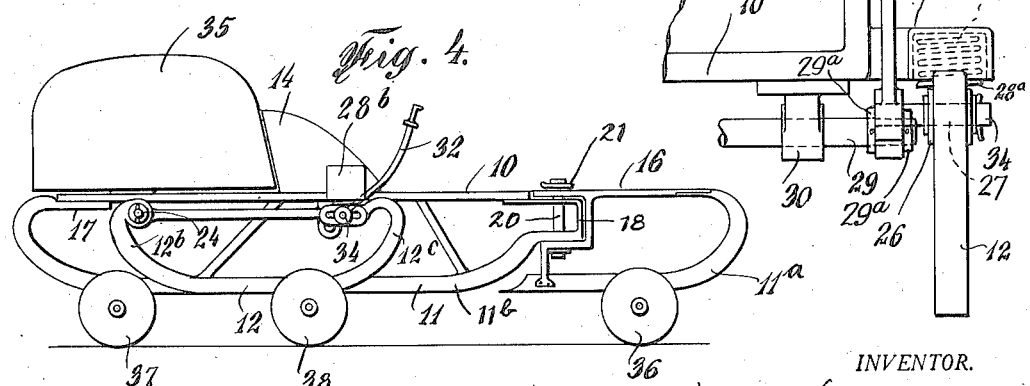
INVENTOR.
LOUIS GELBMAN
BY
ATTORNEY Patented June 9, 1936

2,043,374

UNITED STATES PATENT OFFICE 2,043,374

SNOW PLANE AND SCOOTER PLANE

Louis Gelbman, Yonkers, N. Y.

Application February 12, 1935, Serial No. 6,150

8 Claims. (Cl. 280—8)

This invention relates to new and useful improvements in a snow plane and scooter plane.

The invention has for an object the construction of a device as mentioned which is characterized by a main runner, coaster or the like element or mechanism on the bottom of a body for supporting a person or load and extending longitudinally along the center or balance line of the device, and a pair of runners or coaster support elements or mechanism on the bottom of said body at the sides adapted to normally engage the ground for holding the device in an upright position and retractable during the flight of the device, so that the device moves along on the main runner or coaster element or mechanism.

Still further, the invention contemplates a very novel construction of the pair of coaster support elements or mechanism so that they may be readily removed from their ground contacting positions.

Another object of the invention is the provision of means for flexing the main runner or coaster element or mechanism, or the moving thereof, for the steering of the device.

A further object of the invention is the provision of a tail plane upon the device to assist in directing it in a straight line during motion.

Still further, the invention proposes the construction of a device as described which is simple and durable and which can be manufactured and sold at a reasonable cost.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:—

Fig. 1 is a side elevational view of a device constructed according to this invention.

Fig. 2 is a plan view.

Fig. 3 is a fragmentary elevational view looking in the direction of the line 4—4 of Fig. 2.

Fig. 4 is a view similar to Fig. 1 but illustrating another embodiment of the invention.

The snow plane, according to this invention, comprises a body 10 for supporting a person or load, a main runner or coaster element or mechanism 11 on the bottom of said body and extending longitudinally along the center or balance line of the device, a pair of runner or coaster elements 12 at the bottom of said body and at the sides thereof, and means manually operable during the transit of the device for moving the pair of runner or coaster support elements or mechanism out of contact with the ground.

A seat 14 is mounted upon the body 10 and is composed of a seat back 14a and a pair of side arms 14b. The main runner or coaster element 11 consists of a movable front section 11a and a stationary rear section 11b. The section 11a has a curved front end and terminates in a bottom straight portion. A bracket 16 is rigidly connected between the portion 15 and the rear of the straight portion of the said front section 11a.

The rear section 11b of the main runner is attached at its rear end 17 upon the back end of the body 10. The rear end of the runner section 11b is curved and continues in a central flat straight bottom portion, which in turn continues into a raised front end 18 extending over the rear end of the front section 11a. Several struts 19 are connected between the body 10 and the rear section 11b of the runner or coaster element to hold it in relatively stationary position with relation to the body.

A steering mechanism for the device comprises a vertical rod 20 rotatively engaged through the bracket 16, and through the front end 18 of the rear section 11b of the main runner for pivotally supporting the runner front section 11a.

A foot lever 21 for receiving the feet of an operator of the device to steer the device is fixed upon the bracket 16 with its center coinciding with the axis of the rod 20, so that the runner section 11a may be pivoted laterally, right or left to steer the device.

The pair of runner or coaster support elements 12 comprise a pair of side longitudinal members pivotally mounted at their rear extremities 12b upon a transverse shaft 24 supported on lugs 25 attached upon the bottom side of the body 10. The rear ends 12b of the longitudinal members are curved and so arranged that when the front ends 12c are lifted, the members immediately go out of contact with the ground. The front ends 12c of the longitudinal members are rigidly connected with boss portions 26 formed with elongated slots 27. An expansion spring 28a acts against each boss 26 and against the bottom of a cup shaped bracket 28b attached on the body 10 and the seat sides 14b for normally urging the front ends of the longitudinal members downwards to engage with the ground.

Longitudinal brace portions 28 are integral between the front and rear ends of the longitudinal members. A shaft 29 is fixed in standards 30 mounted on the bottom of the body 10. Levers 32 are rotatively mounted on the ends of the shaft 29 and extend upwards to convenient points so as to be readily engaged between the hands of an operator of the device. Collars 29a are pinned on the shaft 29 at both sides of each lever 32 and hold the levers from shifting on the shaft. A transverse pin 34 is fixed at one end on each lever 32 and extends outwards. These transverse pins 34 engage through the slots 27. The arrangement is such that the upper ends of each of the levers 32 may be drawn rearwards to move the pins 34 upwards and so force the front ends of the longitudinal members 12 upwards to move them out of contact with the ground.

A vertical tail 35 is mounted upon the rear of the seat back 14a at the center thereof and functions to cut the air and assist in guiding the device in a straight path during its normal travel.

As illustrated in the form of the invention shown in Figs. 1–3, the main runner or coaster element 11 is in the form of a strip of iron or the like, such as is customarily used on sleds. The pair of runner or coaster support elements 12 are also in the form of strips of iron similar to the runners of sleds. With the runners, the device is adapted to travel on snow and ice. In Fig. 4 another embodiment of the invention has been disclosed in which the device is adapted to run on normal ground, such as pavements and roadways. In this form, one wheel 36 is attached upon the runner section 11a. A wheel 37 is attached upon the rear end of the runner section 11b. Wheels 38 are attached on the front ends of the runner or coaster support elements 12.

In operation of the device the springs 28a normally maintain the pair of runner and coaster support elements 12, or the wheels 38 (depending on the embodiment considered) in contact with the ground. The device is now stable and a rider may place himself in the seat thereof. The device is steered in a conventional manner similar to a sled or coaster. Once it is in flight, the operator draws the levers 32 rearwards to lift the pair of runner or coaster support elements out of contact with the ground. The device then travels on the main central runner or coaster element. This requires the operator to balance himself, necessitating practice and skill.

Should the rider feel himself falling towards one side, he may prevent a spill by immediately moving the lever 32 on that side forwards to permit the runner or coaster support element on that side to engage the ground and support the device until the operator is again capable of gaining his balance.

A good feature of the invention is that the operator of the device is compelled to ride in a sitting position, which adds to his safety. A sitting position gives a better view than "bellywopping", and consequently is much safer. Furthermore, in the event of a collision the operator's head will not receive the direct impact.

While I have illustrated and described my invention with some degree of particularity, I realize that in practice various alterations therein may be made. I therefore reserve the right and privilege of changing the form of the details of construction or otherwise altering the arrangement of the correlated parts without departing from the spirit or the scope of the appended claims.

Having thus described my invention, what I claim as new, and desire to secure by United States Letters Patent is:—

1. A device of the class described, comprising a body for supporting a person or load, a main runner or coaster element or mechanism on the bottom of said body and extending longitudinally along the center or balance line of the device, a pair of runner or coaster support elements or mechanism on the bottom of said body at the sides thereof, and means manually operable during transit of the device for moving the pair of runner or coaster support elements or mechanism out of contact with the ground.

2. A device of the class described, comprising a body for supporting a person or load, a main runner or coaster element or mechanism on the bottom of said body and extending longitudinally along the center or balance line of the device, a pair of runner or coaster support elements or mechanism on the bottom of said body at the sides thereof, and means manually operable during transit of the device for moving the pair of runner or coaster support elements or mechanism out of contact with the ground, said main runner or coaster element or mechanism comprising a front movable section, and a rear stationary section.

3. A device of the class described, comprising a body for supporting a person or load, a main runner or coaster element or mechanism on the bottom of said body and extending longitudinally along the center or balance line of the device, a pair of runner or coaster support elements or mechanism on the bottom of said body at the sides thereof, and means manually operable during transit of the device for moving the pair of runner or coaster support elements or mechanism out of contact with the ground, said main runner or coaster element or mechanism comprising a front movable section, and a rear stationary section, and means pivoting the front section including a transverse foot element for the feet of an operator of the device.

4. A device of the class described, comprising a body for supporting a person or load, a main runner or coaster element or mechanism on the bottom of said body and extending longitudinally along the center or balance line of the device, a pair of runner or coaster support elements or mechanism on the bottom of said body at the sides thereof, and means manually operable during transit of the device for moving the pair of runner or coaster support elements or mechanism out of contact with the ground, said pair of runner or coaster support elements or mechanism comprising longitudinally extending members pivotally mounted at one of their ends, resilient means urging the other ends downwards against the ground, the first-mentioned ends being curved so that the longitudinally extending members may readily be moved out of contact with the ground by opposing said resilient means, and means for lifting the movable ends of said longitudinally extending members upwards.

5. A device of the class described, comprising a body for supporting a person or load, a main runner or coaster element or mechanism on the bottom of said body and extending longitudinally along the center or balance line of the device, a pair of runner or coaster support elements or mechanism on the bottom of said body at the sides thereof, and means manually operable during transit of the device for moving the pair of runner or coaster support elements or mechanism out of contact with the ground, said pair of runner or coaster support elements or mechanism comprising longitudinally extending members pivotally mounted at one of their ends, resilient means urging the other ends downwards against the ground, the first-mentioned ends being curved so that the longitudinally extending members may readily be moved out of contact with the ground by opposing said resilient means, and means for lifting the movable ends of said longitudinally extending members upwards, a shaft being transversely mounted across the rear end of the body, and the rear ends of said longitudinally extending members being mounted upon said shaft.

6. A device of the class described, comprising a body for supporting a person or load, a main runner or coaster element or mechanism on the bottom of said body and extending longitudinally along the center or balance line of the device, a pair of runner or coaster support elements or mechanism on the bottom of said body at the sides thereof, and means manually operable during transit of the device for moving the pair of runner or coaster support elements or mechanism out of contact with the ground, said pair of runner or coaster support elements or mechanism comprising longitudinally extending members pivotally mounted at one of their ends, resilient means urging the other ends downwards against the ground, the first-mentioned ends being curved so that the longitudinally extending members may readily be moved out of contact with the ground by opposing said resilient means, and means for lifting the movable ends of said longitudinally extending members upwards, comprising pivoted levers, and means for connecting the levers with the front ends of the longitudinally extending members to lift the front ends as the levers are moved rearwards.

7. A device of the class described, comprising a body for supporting a person or load, a main runner or coaster element or mechanism on the bottom of said body and extending longitudinally along the center or balance line of the device, a pair of runner or coaster support elements or mechanism on the bottom of said body at the sides thereof, and means manually operable during transit of the device for moving the pair of runner or coaster support elements or mechanism out of contact with the ground, said runner or coaster element or mechanism and said pair of runner or coaster support elements or mechanism being a plain runner of metal.

8. A device of the class described, comprising a body for supporting a person or load, a main runner or coaster element or mechanism on the bottom of said body and extending longitudinally along the center or balance line of the device, a pair of runner or coaster support elements or mehanism on the bottom of said body at the sides thereof, and means manually operable during transit of the device for moving the pair of runner or coaster support elements or mechanism out of contact with the ground, said runner or coaster element or mechanism and said pair of runner or coaster support elements or mechanism being a plain runner of metal, and wheels attached thereon for engaging against the ground.

LOUIS GELBMAN.